US010196311B2

(12) United States Patent
Quinn et al.

(10) Patent No.: US 10,196,311 B2
(45) Date of Patent: Feb. 5, 2019

(54) COMPOSITIONS AND METHODS FOR CONTROLING SETTING OF CARBONATABLE CALCIUM SILICATE CEMENTS CONTAINING HYDRATING MATERIALS

(71) Applicant: Solidia Technologies, Inc., Piscataway, NJ (US)

(72) Inventors: Sean Quinn, Piscataway, NJ (US); Sadananda Sahu, Piscataway, NJ (US)

(73) Assignee: Solidia Technologies, Inc., Piscataway, NJ (US)

(*) Notice: Subject to any disclaimer, the term of this patent is extended or adjusted under 35 U.S.C. 154(b) by 20 days.

(21) Appl. No.: 14/874,350

(22) Filed: Oct. 2, 2015

(65) Prior Publication Data

US 2016/0096773 A1 Apr. 7, 2016

Related U.S. Application Data

(60) Provisional application No. 62/059,421, filed on Oct. 3, 2014.

(51) Int. Cl.
*C04B 28/24* (2006.01)
*C04B 28/18* (2006.01)
*C04B 28/10* (2006.01)
*C04B 111/00* (2006.01)

(52) U.S. Cl.
CPC .............. *C04B 28/24* (2013.01); *C04B 28/10* (2013.01); *C04B 28/188* (2013.01); *C04B 2111/00017* (2013.01); *Y02P 40/18* (2015.11)

(58) Field of Classification Search
CPC ....... C04B 28/24; C04B 28/10; C04B 28/188; C04B 40/0231; C04B 22/0013; C04B 24/06; C04B 24/10; C04B 2111/00017; C04B 2103/22
See application file for complete search history.

(56) References Cited

U.S. PATENT DOCUMENTS 3,959,004 A * 5/1976 Stryker .................. C04B 28/02
106/123.11
4,274,881 A * 6/1981 Langton .................. C09K 8/42
106/698
4,436,498 A 3/1984 Murray
(Continued)

FOREIGN PATENT DOCUMENTS

WO 2009/103885 A2 8/2009
WO 2009/102360 A2 1/2010
(Continued)

OTHER PUBLICATIONS

IN 143653 Pai et al. Jan. 7, 1978 abstract only.*
(Continued)

*Primary Examiner* — Anthony J Green
(74) *Attorney, Agent, or Firm* — Dentons US LLP

(57) ABSTRACT

The invention provides compositions and methods for controlling setting of carbonatable calcium silicate compositions that are contaminated with hydrating materials. These carbonatable calcium silicate cements are suitable for use as non-hydraulic cement that hardens by a carbonation process and may be applied in a variety of concrete components in the infrastructure, construction, pavement and landscaping industries.

15 Claims, 13 Drawing Sheets

(56) References Cited

U.S. PATENT DOCUMENTS

| | | | |
|---|---|---|---|
| 4,506,025 A * | 3/1985 | Kleeb | C04B 35/14 501/124 |
| 4,956,321 A | 9/1990 | Barrall | |
| 8,114,367 B2 | 2/2012 | Riman et al. | |
| 2005/0284339 A1 | 12/2005 | Brunton et al. | |
| 2007/0062416 A1 | 3/2007 | Brzuskiewicz et al. | |
| 2009/0133361 A1 | 5/2009 | Vera | |
| 2009/0142578 A1 | 6/2009 | Riman et al. | |
| 2009/0143211 A1 | 6/2009 | Riman et al. | |
| 2010/0077691 A1 | 4/2010 | Constantz et al. | |
| 2010/0326328 A1 | 12/2010 | Constantz et al. | |
| 2011/0067600 A1 | 3/2011 | Constantz et al. | |
| 2011/0067605 A1 | 3/2011 | Constantz et al. | |
| 2011/0104469 A1 | 5/2011 | Riman et al. | |
| 2011/0129407 A1 | 6/2011 | Riman et al. | |
| 2011/0182799 A1 | 7/2011 | Riman et al. | |
| 2011/0203489 A1 | 8/2011 | Constantz et al. | |
| 2011/0290156 A1 | 12/2011 | Constantz et al. | |
| 2012/0312194 A1 | 12/2012 | Riman et al. | |
| 2013/0122267 A1 | 5/2013 | Riman et al. | |
| 2014/0127450 A1 | 5/2014 | Riman et al. | |
| 2014/0127458 A1 | 5/2014 | Riman et al. | |
| 2014/0263683 A1 | 9/2014 | Krishnan et al. | |
| 2014/0272216 A1 | 9/2014 | Deo et al. | |
| 2014/0314990 A1 | 10/2014 | Henn et al. | |
| 2014/0322083 A1 | 10/2014 | Kuppler et al. | |
| 2014/0342124 A1 | 11/2014 | Zambrzycki et al. | |
| 2014/0361471 A1 | 12/2014 | Hu et al. | |
| 2014/0363665 A1 | 12/2014 | Kuppler et al. | |
| 2015/0056437 A1 | 2/2015 | Deo et al. | |
| 2015/0225295 A1 | 8/2015 | McCandlish et al. | |
| 2015/0266778 A1 | 9/2015 | Riman et al. | |
| 2015/0336852 A1 | 11/2015 | Patten et al. | |
| 2016/0031757 A1 * | 2/2016 | Atakan | C04B 12/00 106/640 |
| 2016/0096773 A1 | 4/2016 | Quinn et al. | |
| 2016/0168720 A1 | 6/2016 | Jain et al. | |
| 2017/0121223 A1 * | 5/2017 | Atakan | C04B 7/43 |
| 2017/0253530 A1 * | 9/2017 | Sahu | C04B 28/18 |
| 2017/0260096 A1 * | 9/2017 | Sahu | C04B 28/18 |

FOREIGN PATENT DOCUMENTS

| | | |
|---|---|---|
| WO | 2011/053598 A2 | 5/2011 |
| WO | 2011/090967 A2 | 7/2011 |
| WO | 2012/122031 A2 | 9/2012 |
| WO | 2014/159832 A2 | 10/2014 |
| WO | 2014/160168 A2 | 10/2014 |
| WO | 2014/165252 A2 | 10/2014 |
| WO | 2014/165257 A2 | 10/2014 |
| WO | 2014/197532 A2 | 12/2014 |
| WO | 2014/197545 A2 | 12/2014 |
| WO | 2015/026900 A2 | 2/2015 |
| WO | 2015/051243 A2 | 4/2015 |
| WO | 2015/103107 A2 | 7/2015 |
| WO | 2015/112655 A2 | 7/2015 |
| WO | 2016/022485 A2 | 2/2016 |
| WO | 2016/022522 A2 | 2/2016 |
| WO | 2016/054602 A2 | 4/2016 |

OTHER PUBLICATIONS

JP 354134096 A Kondo et al. Oct. 18, 1979 abstract only.*
PCT/US2014/024987, Int'l Search Report of ISA, dated Aug. 14, 2014.
PCT/US2014/025278, Int'l Search Report of ISA, dated Aug. 14, 2014.
PCT/US2014/024996, Int'l Search Report of ISA, dated Aug. 21, 2014.
PCT/US2014/025958, Int'l Search Report of ISA, dated Sep. 4, 2014.
PCT/US2014/040816, Int'l Search Report of ISA, dated Oct. 30, 2014.
PCT/US2014/040789, Int'l Search Report of ISA, dated Sep. 30, 2014.
PCT/US2014/059024, Int'l Search Report of ISA, dated Apr. 2, 2015.
PCT/US2014/072494, Int' Search Report and Written Opinion of ISA, dated Jun. 4, 2015.
PCT/US2015/043452, Int' Search Report and Written Opinion of ISA, dated Dec. 17, 2015.
PCT/US2015/043540, Int' Search Report and Written Opinion of ISA, dated Jan. 27, 2016.
PCT/US2016/023181, Int' Search Report and Written Opinion of ISA, dated Jun. 13, 2016.
PCT/US2015/053879, Int' Search Report and Written Opinion of ISA, dated Jan. 28, 2016.
PCT/US2016/023193, Int' Search Report and Written Opinion of ISA, dated Jun. 13, 2016.

* cited by examiner

COMPOSITIONS AND METHODS FOR CONTROLING SETTING OF CARBONATABLE CALCIUM SILICATE CEMENTS CONTAINING HYDRATING MATERIALS

PRIORITY CLAIMS AND RELATED PATENT APPLICATIONS

This application claims the benefit of priority from U.S. Provisional Application Ser. No. 62/059,421 filed on Oct. 3, 2014, the entire content of which is incorporated herein by reference in its entirety.

FIELD OF THE INVENTION

The invention generally relates to calcium silicate compositions. More particularly, the invention relates to compositions and methods for controlling setting of carbonatable calcium silicate compositions that are contaminated with hydrating materials. These calcium silicate compositions and related phases (also collectively referred to as "carbonatable calcium silicate cements") are suitable for use as non-hydraulic cement that hardens by a carbonation process and may be applied in a variety of concrete components in the infrastructure, construction, pavement and landscaping industries.

BACKGROUND OF THE INVENTION

Concrete is the most consumed man-made material in the world. A typical concrete is made by mixing Portland cement, water and aggregates such as sand and crushed stone. Portland cement is a synthetic material made by burning a mixture of ground limestone and clay, or materials of similar composition in a rotary kiln at a sintering temperature of 1450° C. Portland cement manufacturing is not only an energy-intensive process, but one which releases considerable quantities of greenhouse gas ($CO_2$). The cement industry accounts for approximately 5% of global anthropogenic $CO_2$ emissions. More than 60% of this $CO_2$ comes from the chemical decomposition, or calcination of limestone.

There has been a growing effort to reduce total $CO_2$ emissions within the cement industry. According to a proposal by the International Energy Agency, the cement industry needs to reduce its $CO_2$ emissions from 2.0 Gt in 2007 to 1.55 Gt by 2050. This represents a daunting task because, over this same period, cement production is projected to grow from 2.6 Gt to 4.4 Gt.

To meet this challenge, a revolutionary approach to cement production is required that significantly reduces the energy requirement and $CO_2$ emissions of a cement plant. Ideally, the new approach preferably offers the ability to permanently and safely sequester $CO_2$ while being adaptable and flexible in equipment and production requirements, allowing manufacturers of conventional cement to easily convert to the new platform.

Carbonatable calcium silicate cements provide a foundation for a revolutionary approach to cement production that significantly reduces the energy requirement and $CO_2$ emissions. Carbonatable calcium silicate cements are suitable for use as non-hydraulic cement that hardens by a carbonation process and may be applied in a variety of concrete components in the infrastructure, construction, pavement and landscaping industries. Challenges remain, however, in the effort to realize the full potential of carbonatable calcium silicate-based cement technology. For instance, improvements are desired that can effectively control cement setting in order to take full advantage of the promising non-hydraulic and non-setting cement technology.

SUMMARY OF THE INVENTION

The invention provides compositions and methods for controlling setting of carbonatable calcium silicate compositions that are contaminated with hydrating materials.

In one aspect, the invention generally relates to a calcium silicate composition having one or more discrete calcium silicate phases and one or more set-retarding or hydration-controlling compounds or admixtures. The one or more discrete calcium silicate phases are selected from CS (wollastonite or pseudowollastonite), C3S2 (rankinite), C2S (belite, larnite, bredigite), and an amorphous calcium silicate phase. The calcium silicate composition is suitable for carbonation with $CO_2$ at a temperature of about 30° C. to about 90° C. to form $CaCO_3$ with a mass gain of about 10% or more.

In another aspect, the invention generally relates to a method for suppressing premature setting of a carbonateable calcium silicate composition having one or more hydraulic contaminants. The method includes adding one or more set-retarding or hydration-controlling compounds or admixtures to a carbonateable calcium silicate composition or a precursor composition thereof.

In yet another aspect, the invention generally relates to a method for accelerating the drying rate or the curing rate of a carbonatable calcium silicate cement having one or more hydraulic contaminants. The method includes adding one or more set-retarding or hydration-controlling compounds or admixtures to a carbonateable calcium silicate composition or a precursor composition thereof.

In certain embodiments, the set-retarding or hydration-controlling compounds or admixtures include one or more of organic compounds, one or more of inorganic compounds, or a combination thereof.

BRIEF DESCRIPTION OF THE DRAWINGS

The objects and features of the invention can be better understood with reference to the drawings described below, and the claims. The drawings are not necessarily to scale, emphasis instead generally being placed upon illustrating the principles of the invention. In the drawings, like numerals are used to indicate like parts throughout the various views.

DETAILED DESCRIPTION OF THE INVENTION

Figure 1:
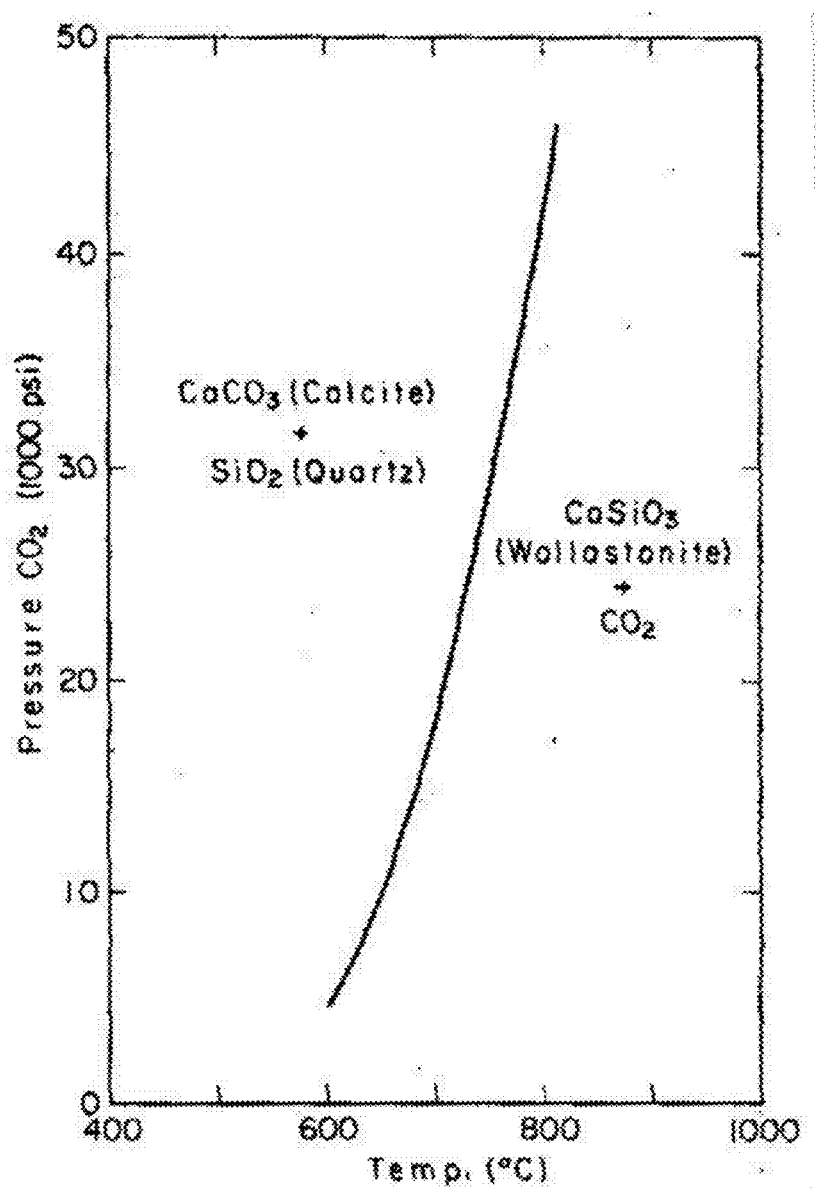
FIG. 1 is a pressure-temperature phase diagram showing the phases present in the reversible reaction $CaCO_3 + SiO_2 \leftrightarrow CaSiO_3$ (calcium silicate) $+ CO_2$.
Figure 2:
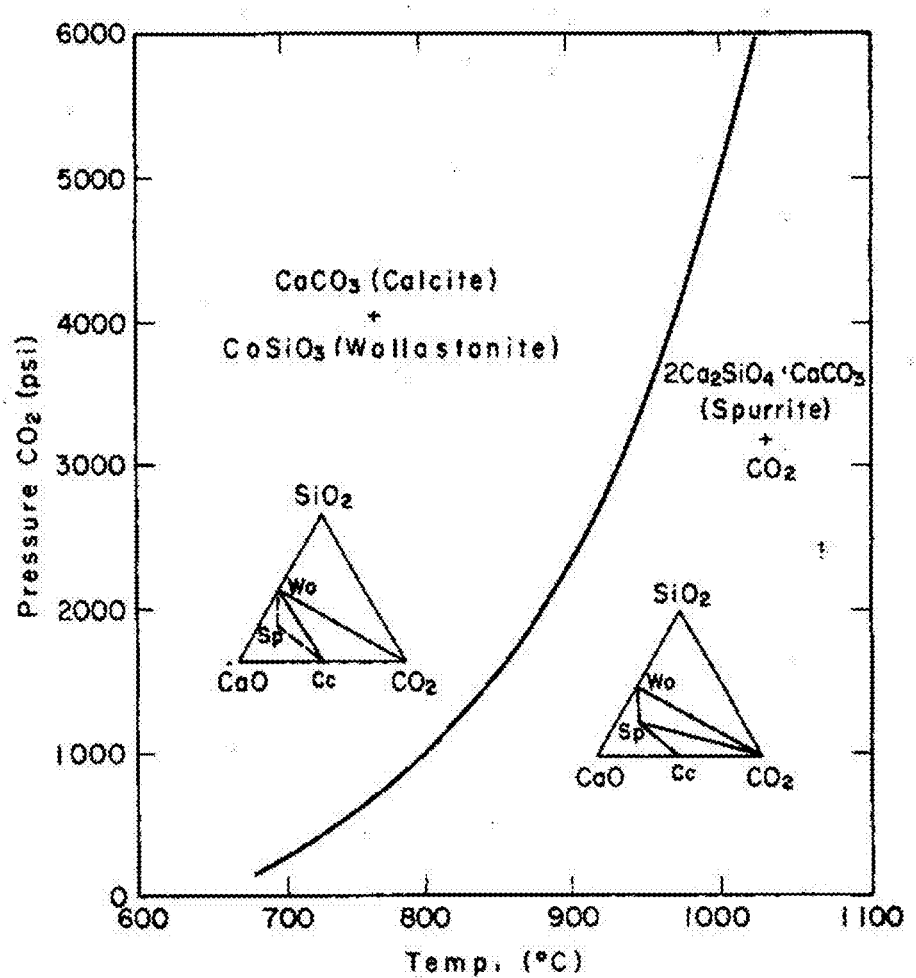
FIG. 2 is a pressure-temperature phase diagram showing the phases present in the reversible reaction $3CaCO_3 + 2CaSiO_3 \leftrightarrow 2Ca_2SiO_4 \cdot CaCO_3 + CO_2$.
Figure 3:
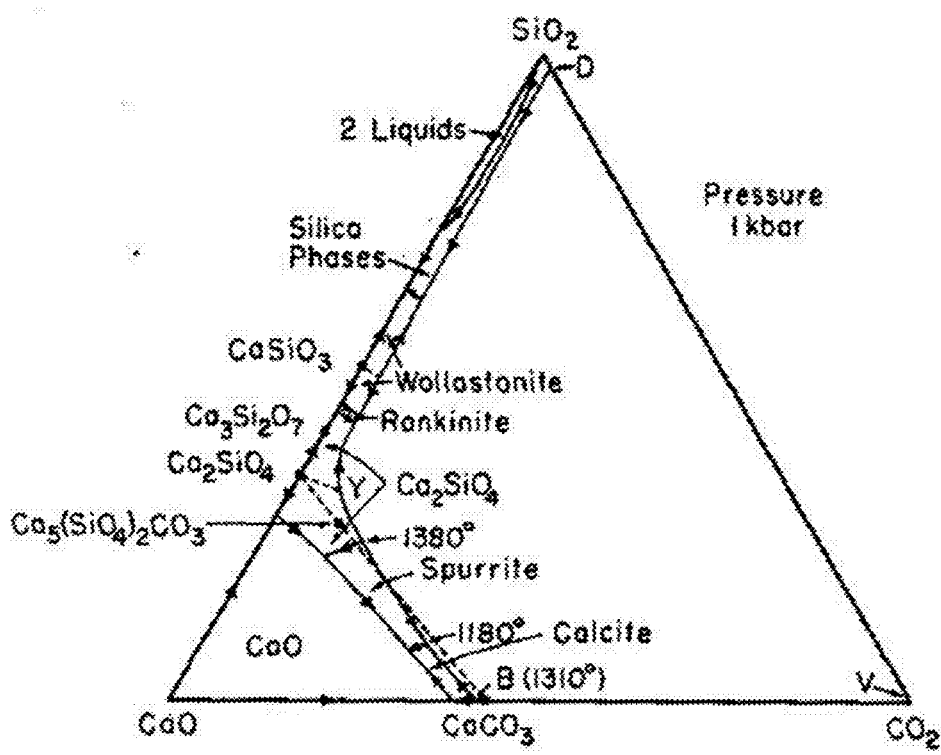
FIG. 3 is a phase diagram of the $CaO$—$SiO_2$—$CO_2$ system at a pressure of 1 kilobar.
Figure 4:
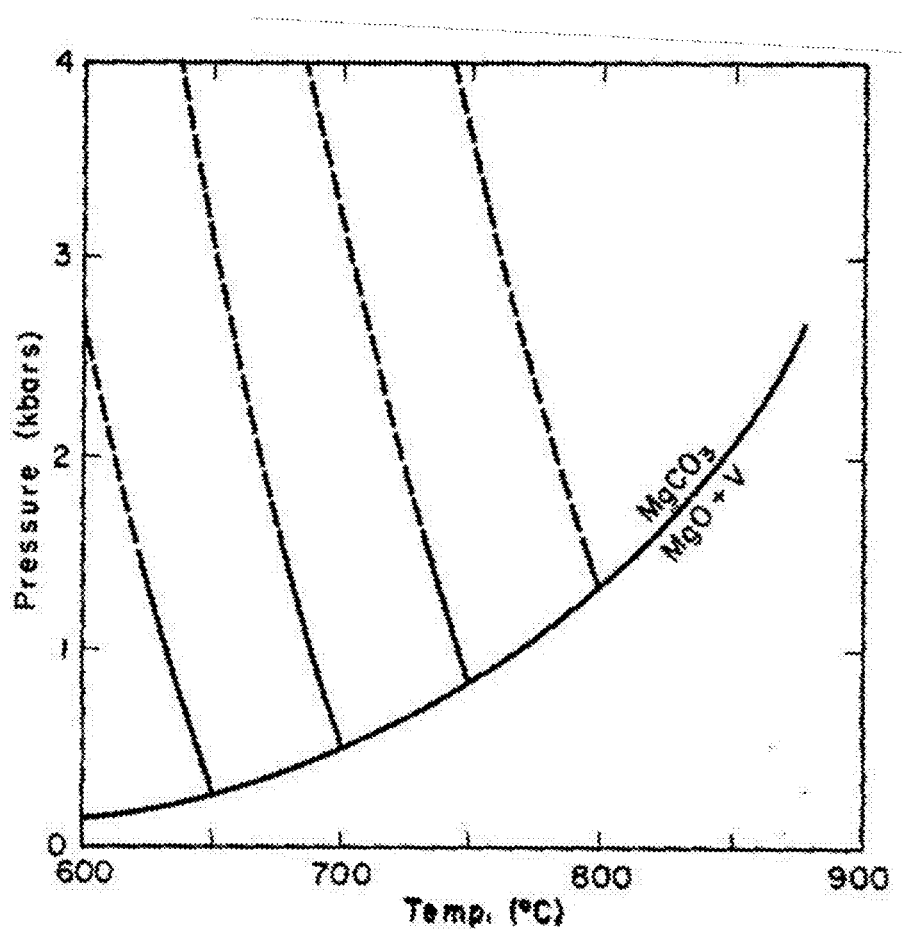
FIG. 4 is a pressure-temperature phase diagram showing the phases present in the reversible reaction $MgO + CO_2 \leftrightarrow MgCO_3$.
Figure 5:
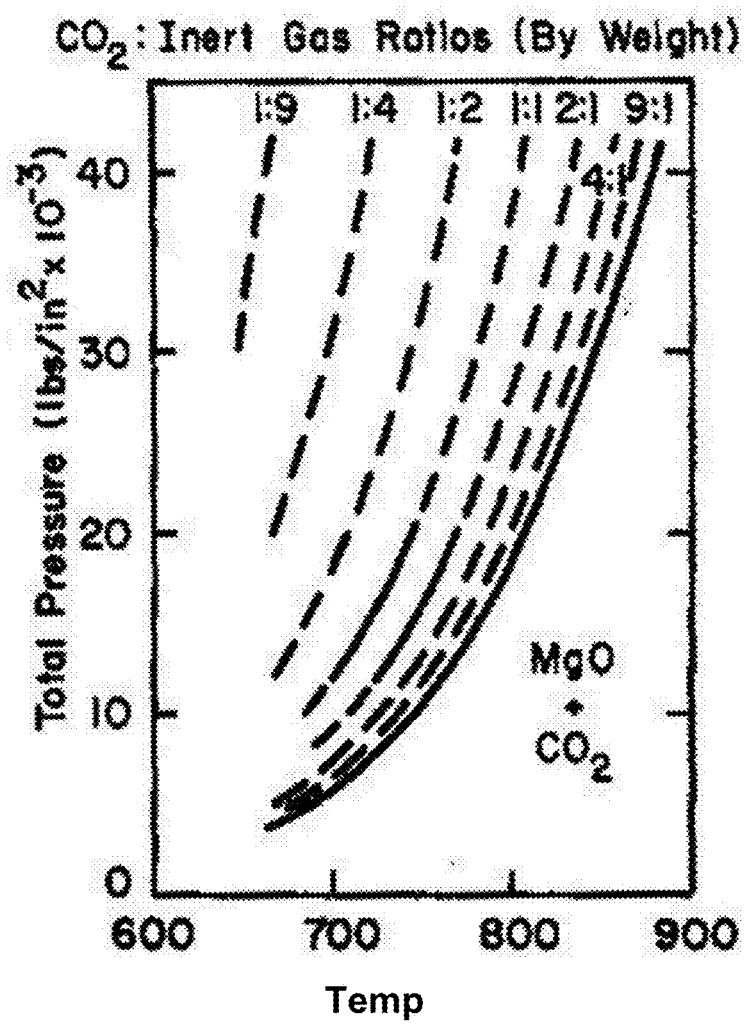
FIG. 5 is a pressure-temperature phase diagram showing the equilibrium curves for the reversible reaction $MgO + CO_2 \leftrightarrow MgCO_3$ as a function of the proportion of $CO_2$ in an inert gas.
Figure 6:
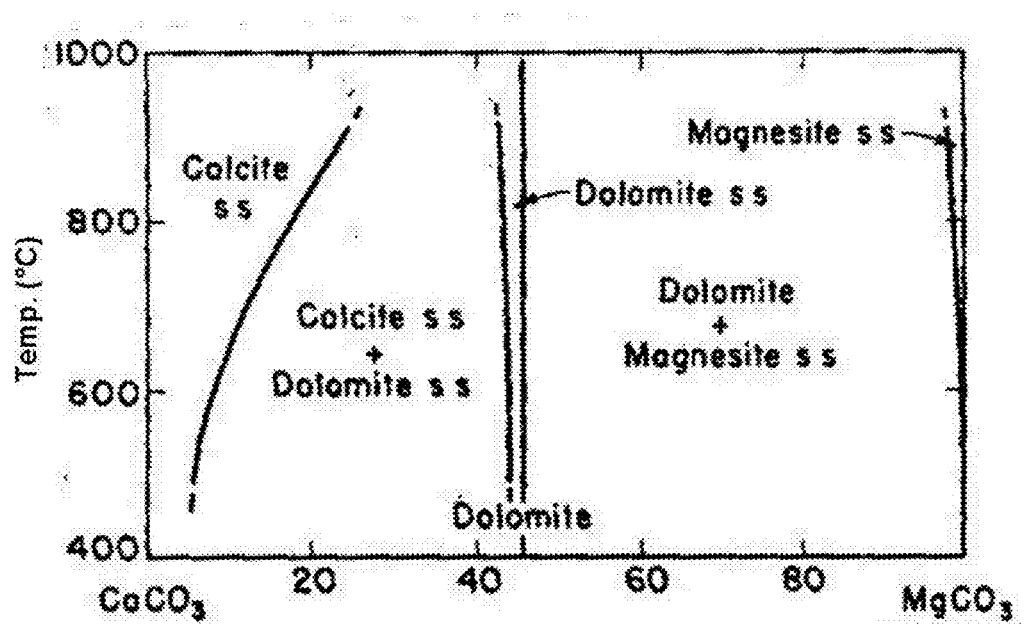
FIG. 6 is a temperature-composition phase diagram that illustrates the stability regions for various phases in the $CaCO_3$—$MgCO_3$ system.
Figure 7:
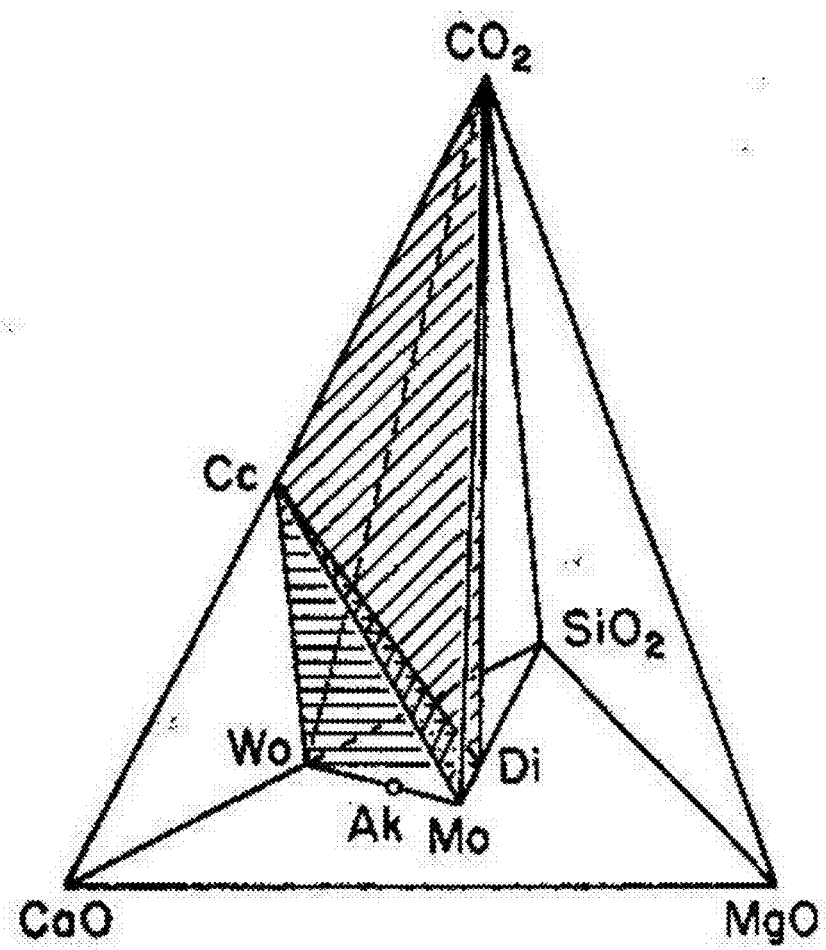
FIG. 7 is a tetrahedron diagram illustrating the phase relationships among the compounds CaO, MgO, SiO$_2$ and CO$_2$, and showing the CO$_2$ deficient region below the Cc-Di-Wo and the Cc-Wo-Mo planes (shaded), where Cc denotes calcite, Wo denotes Wollastonite, Ak denotes Akermanite, Di denotes diopside, and Mo denotes monticellite (CaMgSiO$_4$).
Figure 8:
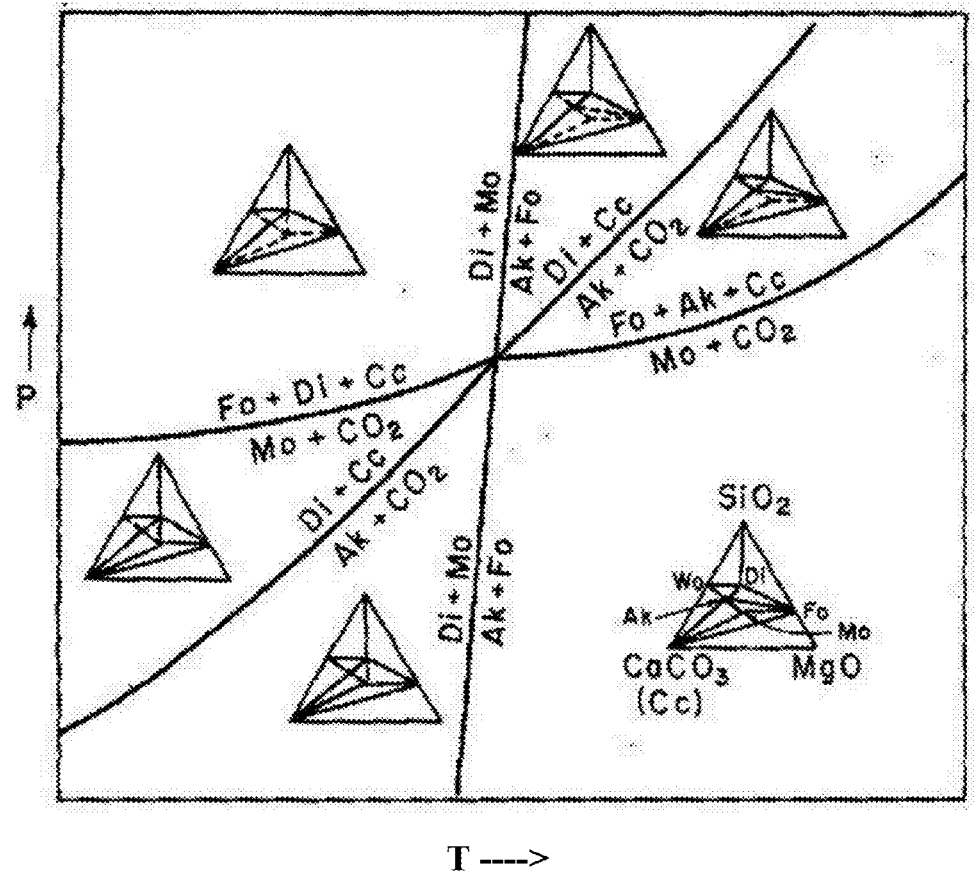
FIG. 8 is a pressure-temperature phase diagram illustrating the phase relationships among the compounds CaO, MgO, SiO$_2$ and CO$_2$, with univariant curves emanating from the quaternary invariant point involving the phases calcite (Cc), diopside (Di), forsterite (Fo), monticellite (Mo), Akermanite (Ak), and CO$_2$. The inset is the phase diagram for the three compound systems of CaCO$_3$, MgO and SiO$_2$.

The invention is based, in part, on the discovery of compositions and methods that effectively control setting of carbonatable calcium silicate compositions that are contaminated with hydrating materials. The compositions and methods of the invention are key to preserve the full production advantages gained from the use of the non-hydraulic and non-setting carbonatable calcium silicate-based cements.

Carbonatable calcium silicate cements provide a foundation for a revolutionary approach to cement production that significantly reduces the energy requirement and CO$_2$ emissions. They are made from widely available, low cost raw materials by a process suitable for large-scale production. The method is flexible in equipment and production requirements and is readily adaptable to manufacturing facilities of conventional cement. The unique approach also offers an exceptional capability to permanently and safely sequester CO$_2$.

Carbonatable calcium silicate cements are produced in commercial cement rotary kilns using the raw materials used for Ordinary Portland Cement (OPC) clinker. An important feature of the carbonatable calcium silicate cements is that they can be produced in the same process lines used to produce OPC.

Carbonatable calcium silicate cements are comprised of discrete calcium silicate phases, which react with CO$_2$. The main reactive phases are CS (wollastonite or pseudowollastonite), C3S2 (rankinite) and (belite or larnite or bredigite). The C2S phase present within the calcium silicate composition may exist as (Ca$_7$Mg(SiO$_4$)$_4$) (bredigite) or as any of α-Ca$_2$SiO$_4$, β-Ca$_2$SiO$_4$ or γ-Ca$_2$SiO$_4$ polymorph or combination thereof. The carbonatable calcium silicate cement may additionally have a reactive amorphous phase of varying composition.

The carbonatable calcium silicate compositions may also include small quantities of residual CaO (lime) and SiO$_2$ (silica) from raw materials after sintering. The calcium silicate composition may also include small quantities of C3S (alite, Ca$_3$SiO$_5$).

The carbonatable calcium silicate compositions may additionally include quantities of inert phases (i.e., non-carbonatable under typical carbonation conditions) such as melilite type minerals (melilite or gehlenite or akermanite) with the general formula (Ca,Na,K)$_2$[(Mg, Fe$^{2+}$, Fe$^{3+}$, Al, SO$_3$O$_7$] and ferrite type minerals (ferrite or brownmillerite or C4AF) with the general formula Ca$_2$(Al, Fe$^{3+}$)$_2$O$_5$.

A major utility of the carbonatable composition of the invention is that it can be carbonated to form composite materials that are useful in a variety of application. The carbonation, for example, may be carried out reacting it with CO$_2$ via a controlled Hydrothermal Liquid Phase Sintering (HLPS) process to create bonding elements that hold together the various components of the composite material. For example in preferred embodiments, CO$_2$ serves as a reactive species resulting in sequestration of CO$_2$ and the creation of bonding elements in the produced composite materials with in a carbon footprint unmatched by any existing production technology. The HLPS process is thermodynamically driven by the free energy of the chemical reaction(s) and reduction of surface energy (area) caused by crystal growth. The kinetics of the HLPS process proceed at a reasonable rate at low temperature because a solution (aqueous or nonaqueous) is used to transport reactive species instead of using a high melting point fluid or high temperature solid-state medium.

Although carbonatable calcium silicate cements are designed to be non-hydraulic, some phases formed during the synthesis of the carbonatable calcium silicate cement may have hydraulic characters. For instance, phases such as CaO (C), Ca$_2$SiO$_4$ (C2S), Ca$_4$Al$_2$Fe$_2$O$_{10}$ (C4AF) or Ca$_3$Al$_2$O$_6$ (C3A) have the potential to react with water. The amorphous phase present in carbonatable calcium silicate cement may also react with water under certain conditions.

Due to the scale and nature of commercial cement production, carbonatable calcium silicate cements produced using commercial OPC rotary kilns and raw materials used for OPC clinker can result in various levels of OPC contamination to be incorporated into carbonatable calcium silicate cements. The main hydrating phases introduced through OPC contamination include Ca$_3$SiO$_5$ (C3S), Ca$_2$SiO$_4$ (C2S), Ca$_3$Al$_2$O$_6$ (C3A), Ca$_4$Al$_2$Fe$_2$O$_{10}$ (C4AF), CaSO$_4$.2H$_2$O (C$\bar{S}$2H) and CaSO$_4$.0.5H$_2$O (C$\bar{S}$0.5H). Sometimes the contaminants could be from other hydrating phase such as 4CaO.3Al$_2$O$_3$.SO$_3$ (C4A3$\bar{S}$). When reacted with water these hydrating phases form hydration products such as Ca(OH)$_2$ (portlandite), Ca$_6$Al$_2$(SO$_4$)$_3$(OH)$_{12}$·26H$_2$O (ettringite) and calcium silicate hydrate (CSH) gel.

In some instances, contaminants could be from the raw materials such as limestone, sand, shale, laterite. However, these raw material contaminates are generally inert and do not affect the mixing, forming and curing process significantly. These contaminants can be introduced into the product during various steps of processing such as clinker storage, clinker milling, cement storage in silo, cement packing and transportation, etc.

As discussed above, carbonatable calcium silicate cements are not designed to set and harden by reacting with water. This special cement does not hydrate to any appreciable degree during the mixing or forming processes. However, the presence of hydraulic species, either formed during the synthesis of the cement or introduced by process contamination during the production of this cement in an OPC plant, can react with mix water, resulting in partial setting and hardening. This negates the production advantages of the carbonatable calcium silicate cement such as easy cleaning of the mixer and forming equipment as well as the recycling of unused concrete.

When mortar and concrete elements made with carbonatable calcium silicate cements are cured in the presence of $CO_2$ at elevated temperatures, the carbonation process is preceded by removal of water and the introduction of $CO_2$ gas into the pores of the concrete products. The subsequent reaction between the $CO_2$ and the carbonatable calcium silicate cement leads to hardening. The removal of water from pores during this curing process is an important step to achieve uniform and high rates of $CO_2$ diffusion throughout the body of the concrete. This ensures uniform reaction and strength development within the body of the concrete product.

Contamination of carbonatable calcium silicate cements by hydraulic phases can be detrimental to water removal from the formed concrete elements. Water transport from the interior of the concrete element can be slowed significantly due to pore blockage caused by the hydration products. Water transport may also be slowed by the adsorption of water molecules onto hydraulic contaminants or hydration products.

Thus, a challenge exists to preserve the production advantages gained from the use of non-hydraulic and non-setting cement.

It has now been unexpectedly found that select combinations and amounts of set-retarding or hydration-controlling admixtures can be used to treat contaminated cement to maintain mix workability. These admixtures, however, are very sensitive to the dosage applied to a certain level of contamination. Careful testing is needed to determine the dosage of the admixtures required for the various types and quantities of contaminants present.

The present invention provides an elegant solution that addresses the technical problems identified above and utilizes commercially available set-retarding and hydration-controlling admixtures in uniquely balanced formulation and dosage. Exemplary organic and inorganic chemicals that may be utilized include:

| Exemplary Organic and Inorganic chemicals | |
|---|---|
| Organic compounds | Lignosulfonates (e.g. Na-lignosulfonates, Ca-lignosulfonates) |
| | Hydroxycarboxylic acids and salts thereof (e.g., malic acid, tartaric acid, citric acid, gluconic acid and salts thereof) |
| | Phosphonates (e.g., aminotri (methylene phosphonic acid)) |
| | Sugars (saccharides) (e.g., sucrose, glucose, fructose) |
| Inorganic compounds | Borates (e.g., boric acid and salts thereof) |
| | Phosphates (e.g., sodium hexametaphosphate, tri-sodium orthophosphate) |

Not wishing to be bound by the theory, it is believed that molecules of these chemicals can adsorb onto the cement particle surface. The adsorption bond links the molecule onto the cement surface, thereby blocking and slowing down the rate of initial hydration of the cement. These molecules may also chelate calcium ions in solution, thereby slowing the crystallization of $Ca(OH)_2$ and $Ca_6Al_2(SO_4)_3(OH)_{12}.26H_2O$ as well as suppressing the nucleation of CSH gel. Set-retardation is mainly controlled by the hydration of $Ca_4Al_2Fe_2O_{10}$ in the presence of above chemicals forming complexes. Hydration control primarily affects the hydration of $Ca_3SiO_5$ and $Ca_2SiO_4$. Many of these chemicals listed above affect both set retarding and hydration control, which take place simultaneously.

Thus, by using of designed formulation and dosage of set-retarding or hydration-controlling admixtures, the invention allows deactivation of the hydraulic contaminants present in carbonatable calcium silicate cements and/or suppress the rate at which the hydraulic contaminants react with water. Either of these effects increases drying rates and improves the $CO_2$ curing process. This deactivation also prevents, reduces or delays the setting of contaminated carbonatable calcium silicate cement.

In one aspect, the invention generally relates to a calcium silicate composition comprising one or more discrete calcium silicate phases and one or more set-retarding or hydration-controlling compounds or admixtures. The one or more discrete calcium silicate phases are selected from CS (wollastonite or pseudowollastonite), C3S2 (rankinite), C2S (belite, larnite, bredigite), and an amorphous calcium silicate phase. The calcium silicate composition is suitable for carbonation with $CO_2$ at a temperature of about 30° C. to about 90° C. to form $CaCO_3$ with a mass gain of about 10% or more.

In another aspect, the invention generally relates to a method for suppressing premature setting of a carbonateable calcium silicate composition comprising one or more hydraulic contaminants. The method includes adding one or more set-retarding or hydration-controlling compounds or admixtures to a carbonateable calcium silicate composition or a precursor composition thereof.

In yet another aspect, the invention generally relates to a method for accelerating the drying rate or the curing rate of a carbonatable calcium silicate cement comprising one or more hydraulic contaminants. The method includes adding one or more set-retarding or hydration-controlling compounds or admixtures to a carbonateable calcium silicate composition or a precursor composition thereof.

In certain preferred embodiments, elemental Ca and elemental Si are present in the composition at a molar ratio from about 0.8 to about 1.2; and metal oxides of Al, Fe and Mg are present in the composition at about 30% or less by mass.

In certain preferred embodiments, the set-retarding or hydration-controlling compounds or admixtures include one or more of organic compounds. For example, the one or more of organic compounds may be selected from lignosulfonates, hydroxycarboxylic acid and salts thereof, phosphonates, and sugars.

In certain preferred embodiments, the set-retarding or hydration-controlling compounds or admixtures comprise one or more of inorganic compounds. For example, the one or more of inorganic compounds are selected from borates and phosphates.

In certain preferred embodiments, the set-retarding or hydration-controlling compounds or admixtures include one or more of organic compounds and one or more of inorganic compounds.

In certain preferred embodiments, the set-retarding compound or admixture includes a sugar-based compound. In certain preferred embodiments, the set-retarding compound or admixture includes a gluconate-based compound. In certain preferred embodiments, the set-retarding compound or admixture includes a sugar-based compound and a gluconate-based compound.

In certain embodiments, the carbonateable calcium silicate composition includes a hydrating phase of CaO or a contamination from Ordinary Portland Cement.

Discussions of various features of HLPS can be found in U.S. Pat. No. 8,114,367, U.S. Pub. No. US 2009/0143211 (application Ser. No. 12/271,566), U.S. Pub. No. US 2011/0104469 (application Ser. No. 12/984,299), U.S. Pub. No. 2009/0142578 (application Ser. No. 12/271,513), U.S. Pub. No. 2013/0122267 (application Ser. No. 13/411,218), U.S. Pub. No. 2012/0312194 (application Ser. No. 13/491,098), WO 2009/102360 (PCT/US2008/083606), WO 2011/053598 (PCT/US2010/054146), WO 2011/090967 (PCT/US2011/021623), U.S. Provisional Patent Application No. 61/708,423 filed Oct. 1, 2012, and U.S. Pub. Nos. 2014/0127450 (application Ser. No. 14/045,758), 2015/0266778 (application Ser. No. 14/045,519), 2014/0127458 (application Ser. No. 14/045,766), 2014/0342124 (application Ser. No. 14/045,540), 2014/0272216 (application Ser. No. 14/207,413), 2014/0263683 (application Ser. No. 14/207,421), 2014/0314990 (application Ser. No. 14/207,920), 2014/0322083 (application Ser. No. 14/209,238), 2014/0363665 (application Ser. No. 14/295,601), 2014/0361471 (application Ser. No. 14/295,402), 2015/0225295 (application Ser. No. 14/602,313), 2015/0056437 (Ser. No. 14/463,901), WO 2015/051243 (PCT/US2014/059024), WO 2015/103107 (PCT/US2014/072494), U.S. application Ser. No. 14/817,193, filed Aug. 3, 2015, U.S. application Ser. No. 14/818,629, filed Aug. 5, 2015, each of which is expressly incorporated herein by reference in its entirety for all purposes.

Figure 9:
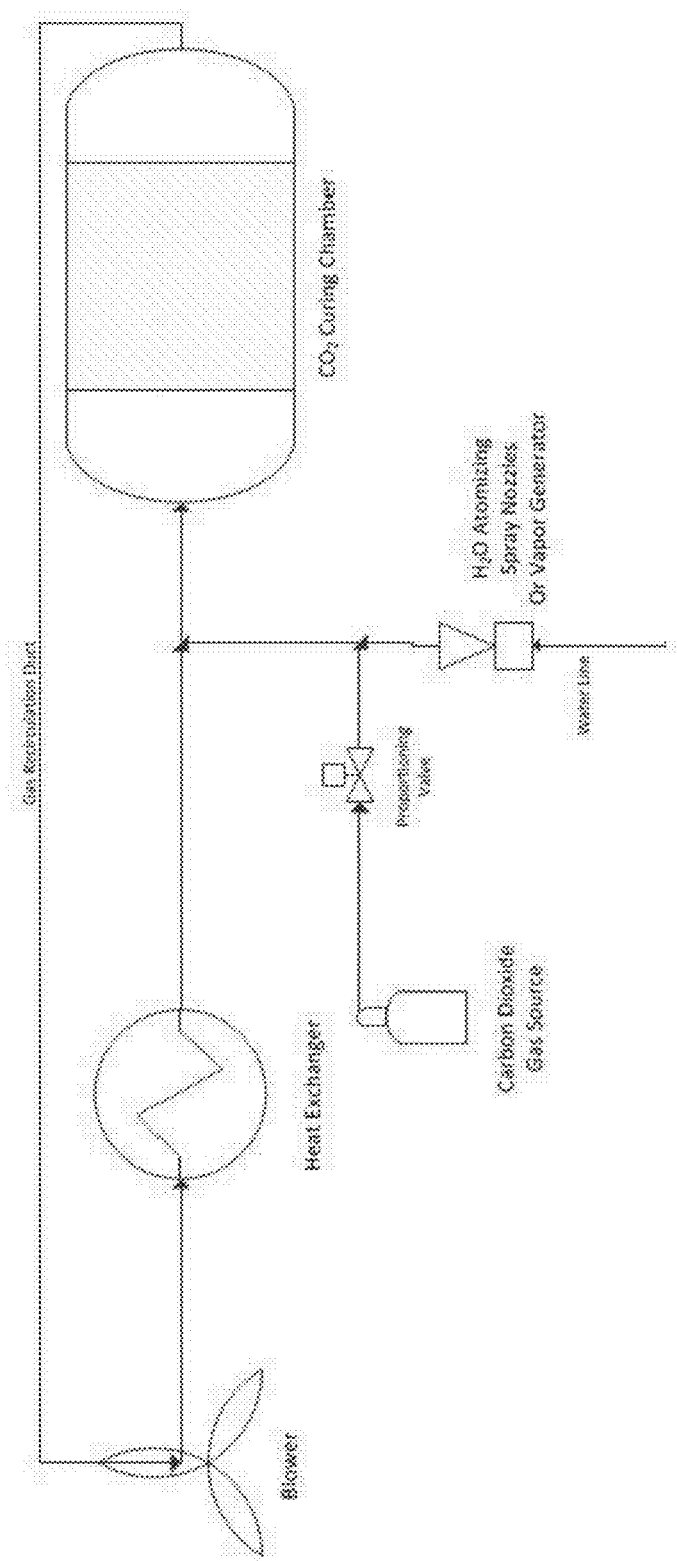
FIG. 9 is a schematic diagram of a CO$_2$ composite material curing chamber that provides humidification according to principles of the invention.
Figure 10:
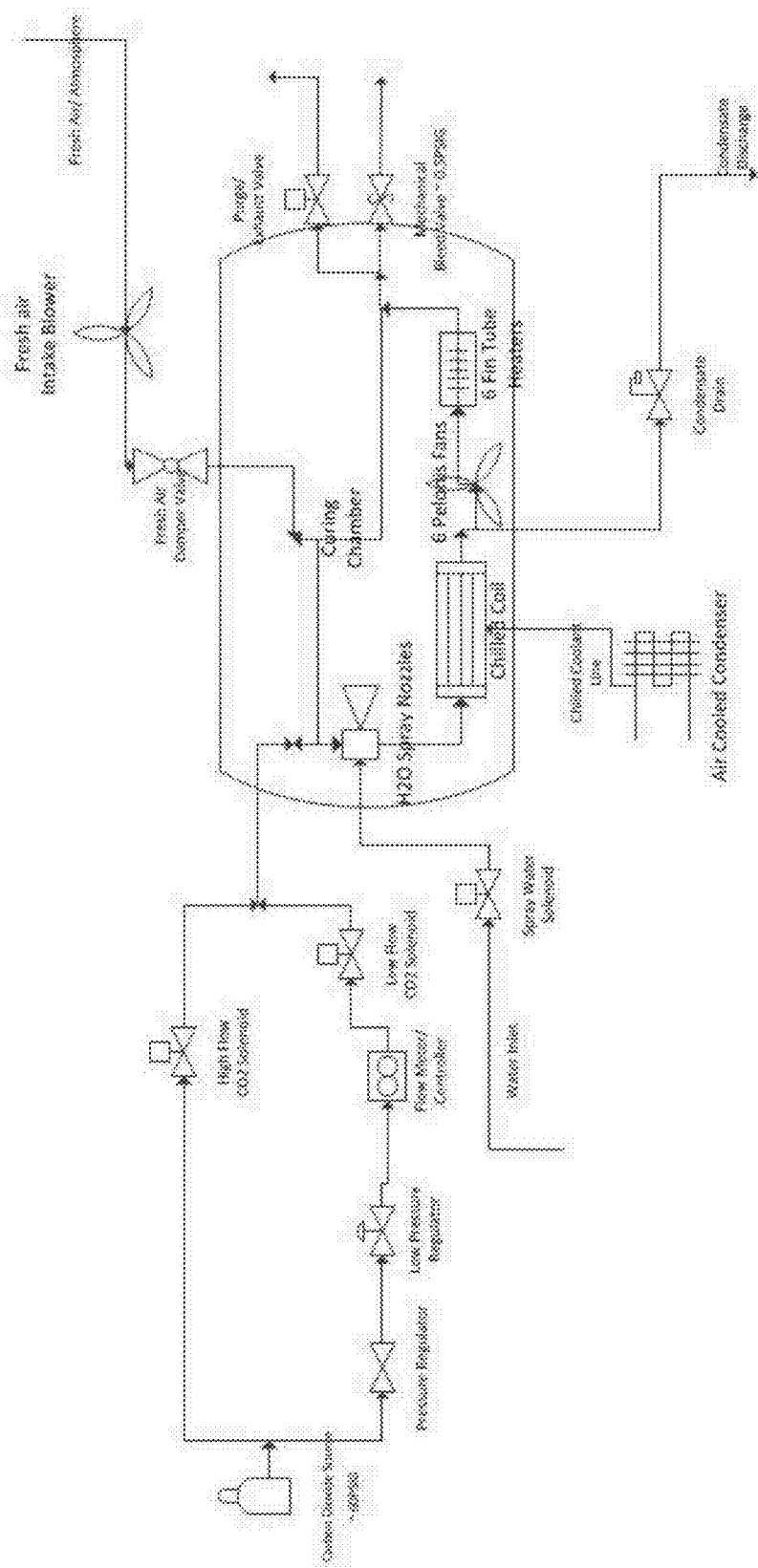
FIG. 10 is a schematic diagram of a curing chamber with multiple methods of humidity control as well as ability to control and replenish CO$_2$ using constant flow or pressure regulation and that can control the temperature according to principles of the invention.

FIG. 1 through FIG. 8 are phase diagrams that show various phase interrelationships among some of the materials described. FIG. 9 is a schematic diagram of a $CO_2$ composite material curing chamber that provides humidification according to principles of the invention. In FIG. 9, a water supply is provided and water vapor is added to the atmosphere that is circulating within the curing chamber. FIG. 10 is a schematic diagram of a curing chamber with multiple methods of humidity control as well as ability to control and replenish $CO_2$ using constant flow or pressure regulation and that can control the temperature according to principles of the invention. This system is an example of a system that can provide closed loop control or control using feedback, in which set values of operating parameters such as $CO_2$ concentration, humidity, and temperature that are desired at specific times in the process cycle are provided, and measurements are taken to see whether the actual value of the parameter being controlled is the desired value.

EXAMPLES

The following non-limiting examples are provided to demonstrate the effect of set-retarding and hydration-controlling admixtures on contaminated carbonatable calcium silicate cements.

In order to measure the effect of an admixture on the setting time of cement, a Vicat instrument is used to measure the rate of stiffening in paste samples. A paste is prepared by mixing 300 g of cement with 90 g of water and the specified dosage of admixture. The water added is reduced to compensate for the water content of the admixture. The paste is then mixed by hand and formed in a cylindrical mold. A weighted needle is allowed to penetrate the paste after a certain interval of time and the depth penetrated by the needle is recorded. Time to initial set is defined as the time elapsed until the needle penetrates 25 mm into the prepared paste. Uncontaminated, non-hydrating carbonatable calcium silicate cement was blended with Type I OPC at the specified levels and tested with different admixture types and dosages (Tables 2-4).

TABLE 2

Initial setting time (minutes) of cement samples with various contamination levels and addition of an experimental admixture composed of 30% sugar and 70% water

|  | Uncontaminated Cement | 1% Type I OPC | 5% Type I OPC |
|---|---|---|---|
| No admixture | 227 | 207 | 116 |
| 10 mL/Kg |  | 415 | 365 |
| 50 mL/Kg |  |  |  |

TABLE 3

Initial setting time (minutes) of cement samples with various contamination levels and addition of an experimental admixture composed of 30% sodium gluconate and 70% water

|  | Uncontaminated Cement | 1% Type I OPC | 5% Type I OPC |
|---|---|---|---|
| No admixture | 227 | 207 | 116 |
| 10 mL/Kg |  | 470 | 365 |
| 50 mL/Kg |  | 180 | 81 |

TABLE 4

Initial setting time (minutes) of cement samples with various contamination levels and addition of an experimental admixture composed of 22.5% sodium gluconate, 7.5% sugar and 70% water

|  | Uncontaminated Cement | 1% Type I OPC | 5% Type I OPC |
|---|---|---|---|
| No admixture | 227 | 207 | 116 |
| 10 mL/Kg |  | 375 | 353 |
| 50 mL/Kg |  | 195 | 117 |

Figure 11:
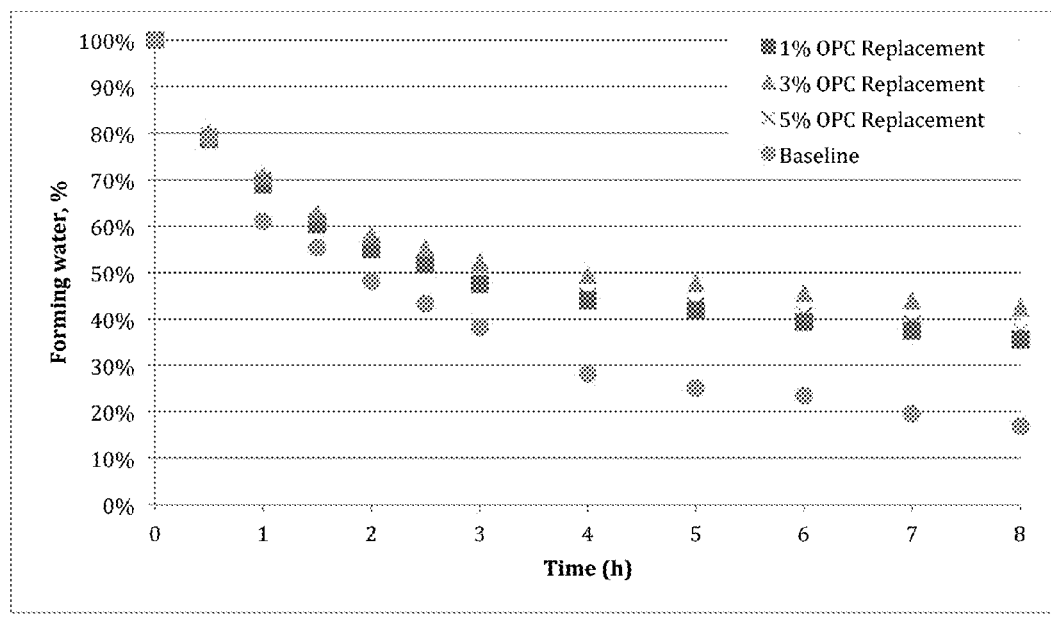
FIG. 11 shows exemplary drying behavior of experimental concrete produced with a carbonatable calcium silicate cement blended with various levels of OPC.
Figure 12:
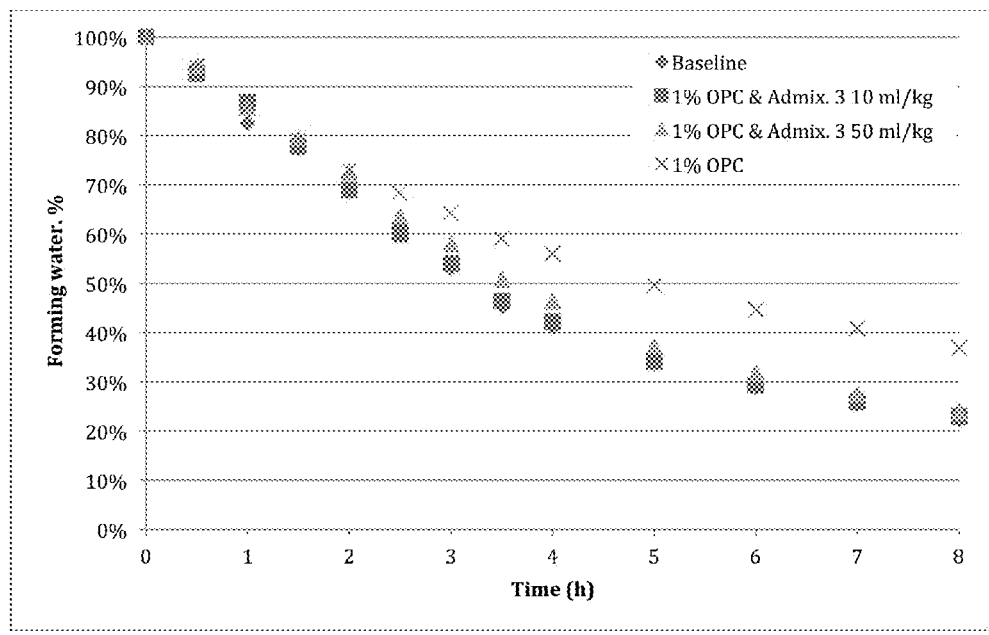
FIG. 12 shows exemplary drying behavior of experimental concrete produced with a carbonatable calcium silicate cement contaminated with 1% OPC and tested with admixture 3 (of 22.5% sodium gluconate, 7.5% sugar and 70% water).
Figure 13:
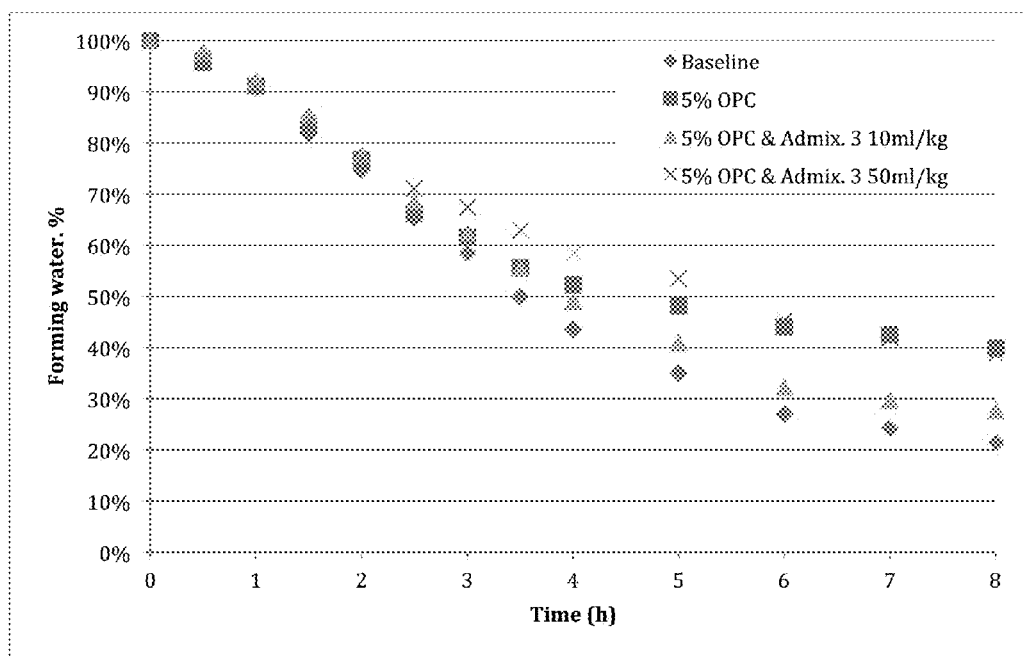
FIG. 13 shows exemplary drying behavior of experimental concrete produced with a carbonatable calcium silicate cement contaminated with 5% OPC and tested with admixture 3 (of 22.5% sodium gluconate, 7.5% sugar and 70% water).

To measure the influence of various levels of contamination and admixture dosage on the drying behavior of a concrete element formed using a known contaminated carbonatable calcium silicate cement, the rate of water loss of cast samples is measured. Concretes mixes are prepared in a small concrete mixture using the mix formulation displayed in Table 5. The samples are removed from the mold and subjected to drying in a convection oven at 70° C. The weight loss of the samples is measured with time and normalized to the original water content to obtain % forming water, which is the proportion of initial water remaining at a given time. Admixture 1 is composed of 30% sugar and 70% water. Admixture 2 is composed of 30% sodium gluconate and 70% water. Admixture 3 is composed of 22.5% sodium gluconate, 7.5% sugar and 70% water. An uncontaminated carbonatable calcium silicate cement sample is run with each experiment as a baseline. The results of the drying experiments are show in FIGS. 11, 12 and 13.

TABLE 5

Mix design for concrete drying experiments

| Component | Composition (wt. %) |
|---|---|
| Carbonatable calcium silicate cement | 18 |
| Construction sand | 31 |
| ¼" Aggregate | 25 |
| ⅜" Aggregate | 26 |
| Water to cement ratio | 0.292 |
| Water reducing admixture | 7 mL/Kg of cement |

As used herein, the term calcium silicate composition or cement refers to naturally-occurring minerals or synthetic materials that are comprised of one or more of a group of calcium-silicon-containing compounds including CS (wollastonite or pseudowollastonite, and sometimes formulated $CaSiO_3$ or $CaO.SiO_2$), C3S2 (rankinite, and sometimes formulated as $Ca_3Si_2O_7$ or $3CaO.2SiO_2$), C2S (belite, $\beta$-$Ca_2SiO_4$ or larnite, $\beta$-$Ca_2SiO_4$ or bredigite, $\alpha$-$Ca_2SiO_4$ or $\gamma$-$Ca_2SiO_4$, and sometimes formulated as $Ca_2SiO_4$ or $2CaO.SiO_2$), a calcium silicate rich amorphous phase, each of which materials may include one or more other metal ions and oxides (e.g., aluminum, magnesium, iron or manganese oxides), or blends thereof, or may include an amount of magnesium silicate in naturally-occurring or synthetic form(s) ranging from trace amount (1%) to about 50% or more by weight.

It should be understood that, compositions and methods disclosed herein can be adopted to use magnesium silicate phases in place of or in addition to calcium silicate phases. As used herein, the term "magnesium silicate" refers to naturally-occurring minerals or synthetic materials that are comprised of one or more of a groups of magnesium-silicon-containing compounds including, for example, $Mg_2SiO_4$ (also known as "fosterite"), $Mg_3Si_4O_{10}(OH)_2$ (also known as "Talc"), and $CaMgSiO_4$ (also known as "monticellite"), each of which materials may include one or more other metal ions and oxides (e.g., calcium, aluminum, iron or manganese oxides), or blends thereof, or may include an amount of calcium silicate in naturally-occurring or synthetic form(s) ranging from trace amount (1%) to about 50% or more by weight.

In this specification and the appended claims, the singular forms "a," "an," and "the" include plural reference, unless the context clearly dictates otherwise.

Unless defined otherwise, all technical and scientific terms used herein have the same meaning as commonly understood by one of ordinary skill in the art. Although any methods and materials similar or equivalent to those described herein can also be used in the practice or testing of the present disclosure, the preferred methods and materials are now described. Methods recited herein may be carried out in any order that is logically possible, in addition to a particular order disclosed.

INCORPORATION BY REFERENCE

References and citations to other documents, such as patents, patent applications, patent publications, journals, books, papers, web contents, have been made in this disclosure. All such documents are hereby incorporated herein by reference in their entirety for all purposes. Any material, or portion thereof, that is said to be incorporated by reference herein, but which conflicts with existing definitions, statements, or other disclosure material explicitly set forth herein is only incorporated to the extent that no conflict arises between that incorporated material and the present disclosure material. In the event of a conflict, the conflict is to be resolved in favor of the present disclosure as the preferred disclosure.

EQUIVALENTS

The representative examples disclosed herein are intended to help illustrate the invention, and are not intended to, nor should they be construed to, limit the scope of the invention. Indeed, various modifications of the invention and many further embodiments thereof, in addition to those shown and described herein, will become apparent to those skilled in the art from the full contents of this document, including the examples which follow and the references to the scientific and patent literature cited herein. The following examples contain important additional information, exemplification and guidance that can be adapted to the practice of this invention in its various embodiments and equivalents thereof.

The invention claimed is:

1. A carbonatable calcium silicate composite comprising:
    a calcium silicate CS, wherein CS is wollastonite, pseudo-wollastonite, or a combination thereof;
    at least one hydraulic species;
    one or more set-retarding or hydration-controlling compounds or admixtures,
    wherein the calcium silicate has a composition and is present in an amount such that it can be cured by carbonation with $CO_2$ at a temperature of about 30° C. to about 90° C. to form $CaCO_3$ with a mass gain of about 10% or more, and form bonding elements that hold the composite together.

2. The carbonatable calcium silicate composite of claim 1, wherein elemental Ca and elemental Si are present in the composition at a molar ratio from about 0.8 to about 1.2; and metal oxides of Al, Fe and Mg are present in the composition at about 30% or less by mass.

3. The carbonatable calcium silicate composite of claim 2, wherein the set-retarding or hydration-controlling compounds or admixtures comprise one or more of organic compounds.

4. The carbonatable calcium silicate composite of claim 3, wherein the one or more of organic compounds are selected from the group consisting of lignosulfonates, hydroxycarboxylic acid and salts thereof, phosphonates, and sugars.

5. The carbonatable calcium silicate composite of claim 1, wherein the set-retarding or hydration-controlling compounds or admixtures comprise one or more of inorganic compounds.

6. The carbonatable calcium silicate composite of claim 5, wherein the one or more of inorganic compounds are selected from borates and phosphates.

7. The carbonatable calcium silicate composite of claim 1, wherein the set-retarding or hydration-controlling compounds or admixtures comprise one or more of organic compounds and one or more of inorganic compounds.

8. The carbonatable calcium silicate composite of claim 7, wherein the set-retarding compound or admixture comprises a sugar-based compound.

9. The carbonatable calcium silicate composite of claim 1, wherein the set-retarding compound or admixture comprises a gluconate-based compound.

10. The carbonatable calcium silicate composite of claim 1, wherein the set-retarding compound or admixture comprises a sugar-based compound and a gluconate-based compound.

11. The carbonatable calcium silicate composite of claim 2, wherein the hydraulic species comprises Ordinary Portland Cement.

12. The carbonatable calcium silicate composite of claim 2, wherein the hydraulic species comprises a hydrating phase of CaO.

13. The carbonatable calcium silicate composite of claim 1, wherein the hydraulic species are present in an amount of 1% or less.

14. The carbonatable calcium silicate composite of claim 1, wherein the hydraulic species comprises one or more of: $CaO$, $Ca_2SiO_4$, $Ca_4Al_2Fe_2O_{10}$, $Ca_3Al_2O_6$, $Ca_3SiO_5$, $CaSO_4.2H_2O$, $CaSO_4.0.5H_2O$, and $4CaO.3Al_2O_3.SO_3$.

15. The carbonatable calcium silicate composite of claim 1, wherein the at least one hydraulic species is present in an amount of 5% or less.

\* \* \* \* \*